United States Patent
Shin et al.

(10) Patent No.: US 12,477,053 B2
(45) Date of Patent: Nov. 18, 2025

(54) ELECTRONIC DEVICE INCLUDING SUPPORT MEMBER

(71) Applicant: Samsung Electronics Co., Ltd., Suwon-si (KR)

(72) Inventors: Kwangha Shin, Suwon-si (KR); Byounguk Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 194 days.

(21) Appl. No.: 18/501,466

(22) Filed: Nov. 3, 2023

(65) Prior Publication Data

US 2024/0073308 A1 Feb. 29, 2024

Related U.S. Application Data

(63) Continuation of application No. PCT/KR2022/005191, filed on Apr. 11, 2022.

(30) Foreign Application Priority Data

May 3, 2021 (KR) .......................... 10-2021-0057272

(51) Int. Cl.
*H04M 1/02* (2006.01)
*H01Q 1/24* (2006.01)

(52) U.S. Cl.
CPC .......... *H04M 1/0277* (2013.01); *H01Q 1/243* (2013.01); *H04M 1/0249* (2013.01)

(58) Field of Classification Search
CPC ... H04M 1/0277; H04M 1/0249; H01Q 1/243
See application file for complete search history.

(56) References Cited

U.S. PATENT DOCUMENTS

2014/0090966 A1* 4/2014 Yu .................... H01H 13/705
                                                              29/447
2014/0353178 A1 12/2014 Kim
(Continued)

FOREIGN PATENT DOCUMENTS

CN          207409647 U     5/2018
CN          208596777 U     3/2019
(Continued)

OTHER PUBLICATIONS

International Search Report dated Jul. 22, 2022, issued in International Patent Application No. PCT/KR2022/005191.

*Primary Examiner* — Allen L Parker
*Assistant Examiner* — Peter Krim
(74) *Attorney, Agent, or Firm* — Jefferson IP Law, LLP

(57) ABSTRACT

An electronic device is provided. The electronic device includes a display, a support member, and a printed circuit board including at least one terminal electrically connected to a connection area of the support member, wherein the support member includes a first metal member including a first protrusion and a first through-hole, a second metal member surrounding at least a part of the first metal member, the second metal member including a second protrusion positioned in the first through-hole and a second through-hole accommodating the first protrusion, a first solder connected to the first protrusion and the second metal member, and a second solder connected to the second protrusion and the first metal member, and the first solder may be positioned in a direction different from that of the second solder with reference to the connection area.

16 Claims, 15 Drawing Sheets

(56) References Cited

U.S. PATENT DOCUMENTS

| | | |
|---|---|---|
| 2016/0064810 A1 | 3/2016 | Smith et al. |
| 2017/0006715 A1 | 1/2017 | Choi et al. |
| 2017/0094848 P1 | 3/2017 | Radler |
| 2018/0017995 A1 | 1/2018 | Gable et al. |
| 2018/0070465 A1 | 3/2018 | Cater et al. |
| 2019/0222683 A1* | 7/2019 | Choi .................. H05K 5/0086 |
| 2019/0372211 A1 | 12/2019 | Hsu et al. |
| 2020/0076056 A1 | 3/2020 | Froese et al. |
| 2020/0084310 A1* | 3/2020 | Keen .................. H01M 50/284 |
| 2020/0389970 A1 | 12/2020 | Koo et al. |

FOREIGN PATENT DOCUMENTS

| | | |
|---|---|---|
| CN | 209017097 A | 6/2019 |
| CN | 110299613 A | 10/2019 |
| KR | H 08243785 A | 9/1996 |
| KR | 10-1999-0053874 A | 7/1999 |
| KR | 10-2014-0141401 A | 12/2014 |
| KR | 10-2016-0018164 A | 2/2016 |
| KR | 10-2017-0004671 A | 1/2017 |
| KR | 10-2017-0036360 A | 4/2017 |
| KR | 10-2018-0113220 A | 10/2018 |
| KR | 10-2018-0115312 A | 10/2018 |
| KR | 10-2020-0026000 A | 3/2020 |
| KR | 10-2020-0139977 A | 12/2020 |

* cited by examiner

ELECTRONIC DEVICE INCLUDING SUPPORT MEMBER

CROSS-REFERENCE TO RELATED APPLICATION(S)

This application is a continuation application, claiming priority under § 365(c), of an international application No. PCT/KR2022/005191, filed on Apr. 11, 2022, which is based on and claims the benefit of a Korean patent application number 10-2021-0057272, filed on May 3, 2021, in the Korean Intellectual Property Office, the disclosure of which is incorporated by reference herein in its entirety.

BACKGROUND

1. Field

The disclosure relates to an electronic device including a support member. More particularly, the disclosure relates to an electronic device including a support member capable of increasing durability of the electronic device and stably maintaining antenna performance.

2. Description of Related Art

The development of information and communication technology and semiconductor technology is leading to integration of various functions into a single portable electronic device. For example, an electronic device may implement an entertainment function, such as a game, a multimedia function, such as music/video playback, a communication and security function for mobile banking and the like, and schedule management and electronic wallet functions, as well as a communication function. These electronic devices are being miniaturized so that users are able to conveniently carry them.

The above information is presented as background information only to assist with an understanding of the disclosure. No determination has been made, and no assertion is made, as to whether any of the above might be applicable as prior art with regard to the disclosure.

SUMMARY

Electronic devices having a communication function, such as portable terminals, are becoming smaller and lighter in order to maximize user portability and convenience, and integrated components are mounted into a smaller space for high performance. For example, an electronic device transmits/receives signals to/from an external electronic device, and a part (e.g., an outer metal) of the electronic device is used as an antenna.

However, in the case where an outer metal and an inner metal of a support member are joined by welding only the end surfaces (e.g., rear surfaces) thereof, welding defects occurs at a contact point between the outer metal and inner metal so that antenna performance is lowered.

Aspects of the disclosure are to address at least the above-mentioned problems and/or disadvantages and to provide at least the advantages described below. Accordingly, an aspect of the disclosure is to provide an electronic device including a support member capable of increasing durability of the electronic device and stably maintaining antenna performance.

Another aspect of the disclosure is to provide an electronic device including a metal sheet capable of stably maintaining antenna performance.

Additional aspects will be set forth in part in the description which follows and, in part, will be apparent from the description, or may be learned by practice of the presented embodiments.

In accordance with an aspect of the disclosure, an electronic device is provided. The electronic device includes a display, a support member, and a printed circuit board including at least one terminal electrically connected to a connection area of the support member, wherein the support member includes a first metal member including a first protrusion and a first through-hole, a second metal member surrounding at least a portion of the first metal member and including a second protrusion positioned in the first through-hole and a second through-hole accommodating the first protrusion, a first solder connected to the first protrusion and the second metal member, and a second solder connected to the second protrusion and the first metal member, and wherein the first solder is positioned in a direction different from that of the second solder, based on the connection area.

In accordance with another aspect of the disclosure, an electronic device is provided. The electronic device includes a display, a support member, a printed circuit board including at least one terminal, and a first metal sheet disposed on the support member and electrically connected to the at least one terminal, wherein the support member includes a first metal member including a first protrusion and a first through-hole, a second metal member surrounding at least a portion of the first metal member and including a second protrusion positioned in the first through-hole and a second through-hole accommodating the first protrusion, a first solder connected to the first protrusion and the second metal member, and a second solder connected to the second protrusion and the first metal member, and wherein the first solder is positioned in a direction different from that of the second solder, based on the first metal sheet.

In accordance with another aspect of the disclosure, a support member is provided. The support member includes a first metal member including a first protrusion and a first through-hole, a second metal member surrounding at least a portion of the first metal member and including a second protrusion positioned in the first through-hole and a second through-hole accommodating the first protrusion, a first solder connected to the first protrusion and the second metal member, and a second solder connected to the second protrusion and the first metal member, and at least a portion of the second solder is disposed on the front surface of the support member, and at least a portion of the first solder is disposed on the rear surface of the support member.

According to various embodiments of the disclosure, an electronic device includes a support member welded on front and rear surfaces using a protrusion and a through-hole. The area in which the support member is bonded increases, thereby increasing durability of the electronic device and stably maintaining antenna performance.

An electronic device according to various embodiments of the disclosure includes a metal sheet attached to a support member. The metal antenna of the support member and a printed circuit board is electrically connected using a metal sheet so that antenna performance is stably maintained.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Figure 1:
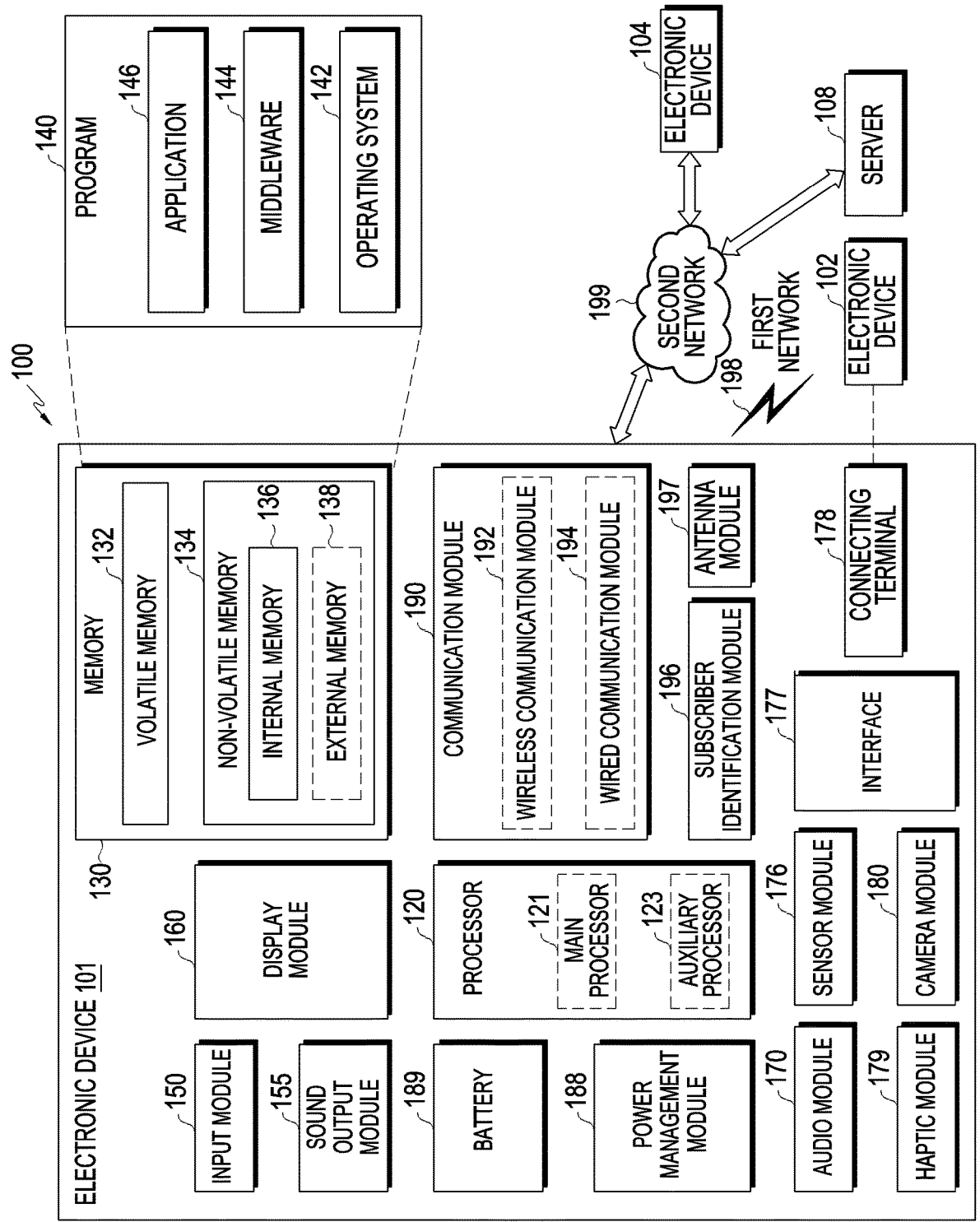
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
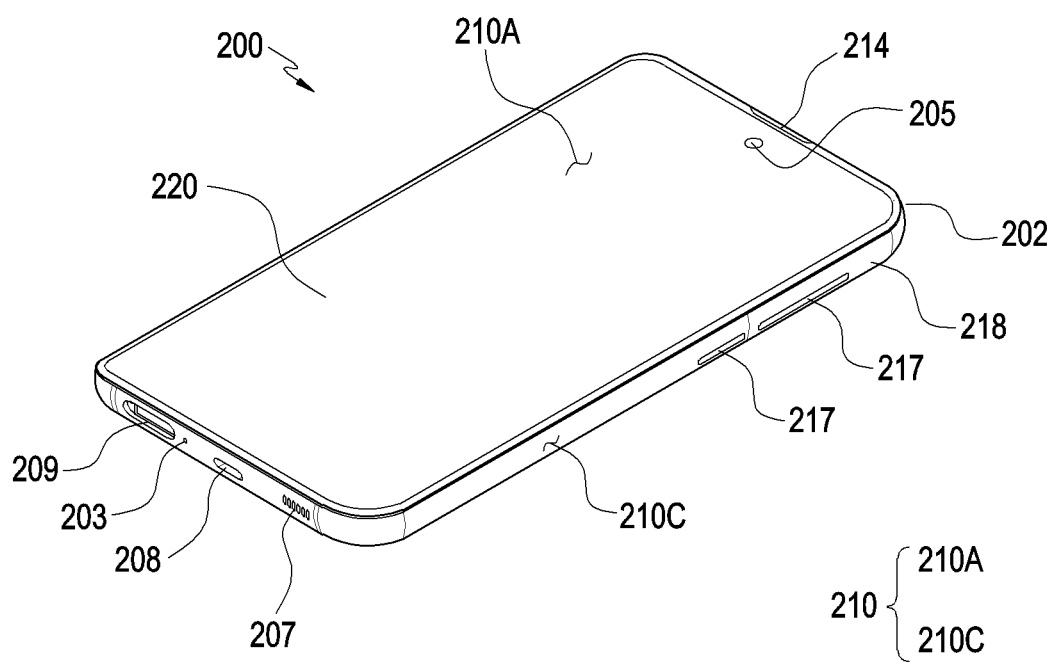
FIG. 2 is a front perspective view of an electronic device according to an embodiment of the disclosure.

FIG. 2 is a front perspective view of an electronic device according to an embodiment of the disclosure.

Figure 3:
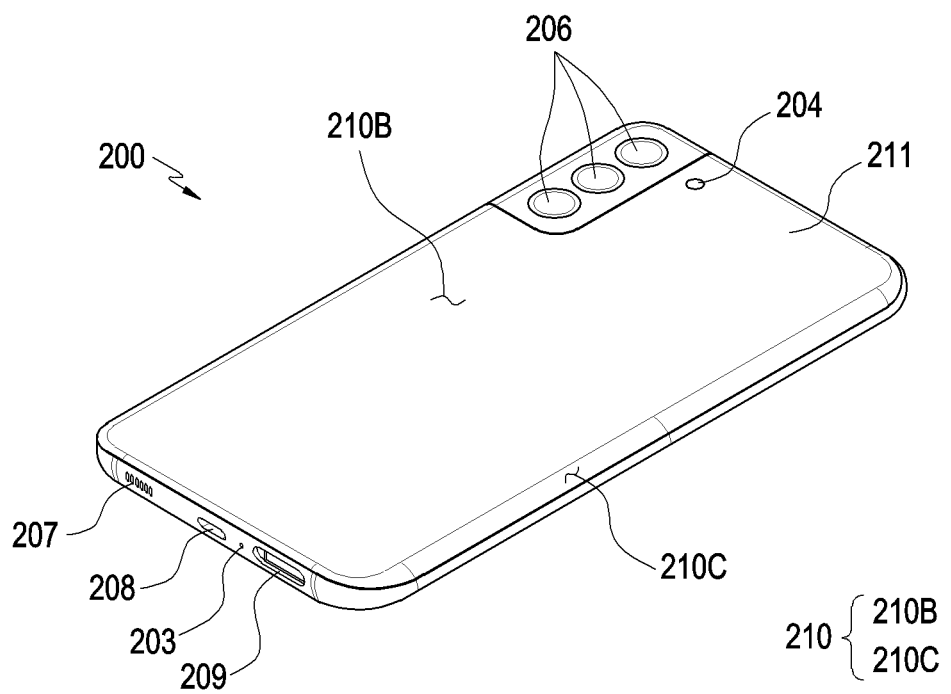
FIG. 3 is a rear perspective view of an electronic device according to an embodiment of the disclosure.

FIG. 3 is a rear perspective view of an electronic device according to an embodiment of the disclosure.

Referring to FIGS. 2 and 3, an electronic device 200 according to an embodiment may include a housing 210 including a front face 210A, a rear face 210B, and a side face 210C surrounding a space between the front face 210A and the rear face 210B. In another embodiment (not shown) of the disclosure, the housing 210 may refer to a structure constituting some of the front face 210A in FIG. 2, and the rear face 210B and the side face 210C in FIG. 3. According to an embodiment of the disclosure, at least a portion of the front face 210A may be formed by a substantially transparent front plate 202 (e.g., a glass plate or polymer plate including various coating layers). The rear face 210B may be formed by the rear plate 211. The rear plate 211 may be formed of, for example, glass, ceramic, polymer, metal (e.g., aluminum, stainless steel (STS), or magnesium), or a combination of at least two of the above materials. The side face 210C may be formed by a side bezel structure (or "side member") 218 coupled to the front plate 202 and the rear plate 211 and including metal and/or polymer. In some embodiments of the disclosure, the rear plate 211 and the side bezel structure 218 may be integrally formed and include the same material (e.g., glass, a metal material, such as aluminum, or ceramic). According to another embodiment of the disclosure, the front face 210A and/or the front plate 202 may be interpreted as part of a display 220.

According to an embodiment of the disclosure, the electronic device 200 may include at least one of a display 220, audio modules 203, 207, and 214 (e.g., the audio module 170 in FIG. 1), a sensor module (e.g., the sensor module 176 in FIG. 1), camera modules 205 and 206 (e.g., the camera module 180 in FIG. 1), a key input device 217 (e.g., the input module 150 in FIG. 1), and connector holes 208 and 209 (e.g., the connection terminal 178 in FIG. 1). In some embodiments of the disclosure, the electronic device 101 may exclude at least one (e.g., the connector hole 209) of the elements or further include other elements.

According to an embodiment of the disclosure, the display 220 may be visually exposed through, for example, a substantial portion of the front plate 202. In some embodiments of the disclosure, the edge of the display 220 may be formed to have substantial the same shape as an adjacent outer shape of the front plate 202. In another embodiment (not shown), in order to expand the area where the display 220 is exposed, the distance between the periphery of the display 220 and the periphery of the front plate 202 may be formed to be substantially the same.

According to an embodiment of the disclosure, the surface (or the front plate 202) of the housing 210 may include a screen display area formed as the display 220 is visually exposed. For example, the screen display area may include the front face 210A.

In another embodiment (not shown) of the disclosure, the electronic device 101 may include a recess or opening formed in a portion of the screen display area (e.g., the front face 210A) of the display 220 and include at least one or more of an audio module 214, a sensor module (not shown), a light-emitting device (not shown), and a camera module 205 aligned with the recess or opening. In another embodiment (not shown) of the disclosure, at least one or more of an audio module 214, a sensor module (not shown), a camera module 205, a fingerprint sensor (not shown), and a light-emitting device (not shown) may be included in the rear surface of the screen display area of the display 220.

In another embodiment (not shown) of the disclosure, the display 220 may be coupled to or disposed adjacent to a touch sensing circuit, a pressure sensor capable of measuring the intensity (pressure) of a touch, and/or a digitizer that detects a magnetic stylus pen.

In some embodiments of the disclosure, at least a part of the key input device 217 may be disposed on the side bezel structure 218.

According to an embodiment of the disclosure, the audio modules 203, 207, and 214 may include, for example, a microphone hole 203 and speaker holes 207 and 214. A microphone for obtaining external sound may be disposed inside the microphone hole 203, and in some embodiments of the disclosure, a plurality of microphones may be disposed to detect the direction of sound. The speaker holes 207 and 214 may include an external speaker hole 207 and a receiver hole 214 for calls. In some embodiments of the disclosure, the speaker holes 207 and 214 and the microphone hole 203 may be implemented as one hole, or a speaker (e.g., a piezo speaker) may be included without the speaker holes 207 and 214.

According to an embodiment of the disclosure, the sensor module (not shown) may generate an electrical signal or data value corresponding to an internal operating state of the electronic device 200 or an external environmental state. The sensor module (not shown) may include, for example, a first sensor module (not shown) (e.g., a proximity sensor) and/or a second sensor module (not shown) (e.g., a fingerprint sensor) disposed on the front face 210A of the housing 210, and/or a third sensor module (not shown) (e.g., an HRM sensor) and/or a fourth sensor module (not shown) (e.g., a fingerprint sensor) disposed on the rear face 210B of the housing 210. In some embodiments (not shown) of the disclosure, the fingerprint sensor may be disposed on the rear face 210B of the housing 210 as well as on the front face 210A (e.g., the display 220) thereof. The electronic device 101 may further include a sensor module that is not shown, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor (not shown).

According to an embodiment of the disclosure, the camera modules 205 and 206 may include, for example, a front camera module 205 disposed on the front face 210A of the electronic device 101, a rear camera module 206 disposed on the rear face 210B thereof, and/or a flash 204. The camera modules 205 and 206 may include one or a plurality of lenses, an image sensor, and/or an image signal processor. The flash 204 may include, for example, a light-emitting diode or a xenon lamp. In some embodiments of the disclosure, two or more lenses (an infrared camera, and wide-angle and telephoto lenses) and image sensors may be disposed on one face of electronic device 101.

According to an embodiment of the disclosure, the key input device 217 may be disposed on the side face 210C of the housing 210. In another embodiment of the disclosure, the electronic device 101 may exclude some or entirety of the above-mentioned key input device 217, and the excluded key input device 217 may be implemented in different forms, such as a soft key, on the display 220.

According to an embodiment of the disclosure, a light-emitting device (not shown) may be disposed on, for example, the front face 210A of the housing 210. The light-emitting device (not shown) may provide state information of the electronic device 101, for example, in the form of light. In another embodiment of the disclosure, the light-emitting device (not shown) may provide, for example, a light source interworking with the operation of the front camera module 205. The light-emitting device (not shown) may include, for example, an LED, an IR LED, and/or a xenon lamp.

According to an embodiment of the disclosure, the connector holes 208 and 209 may include, for example, a first connector hole 208 capable of receiving a connector (e.g., a USB connector) for transmitting/receiving power and/or data to/from external electronic devices or a connector (e.g., an earphone jack) for transmitting/receiving audio signals to/from external electronic devices, and/or a second connector hole 209 capable of receiving a storage device (e.g., a subscriber identification module (SIM) card). According to an embodiment of the disclosure, the first connector hole 208 and/or the second connector hole 209 may be omitted.

Figure 4:
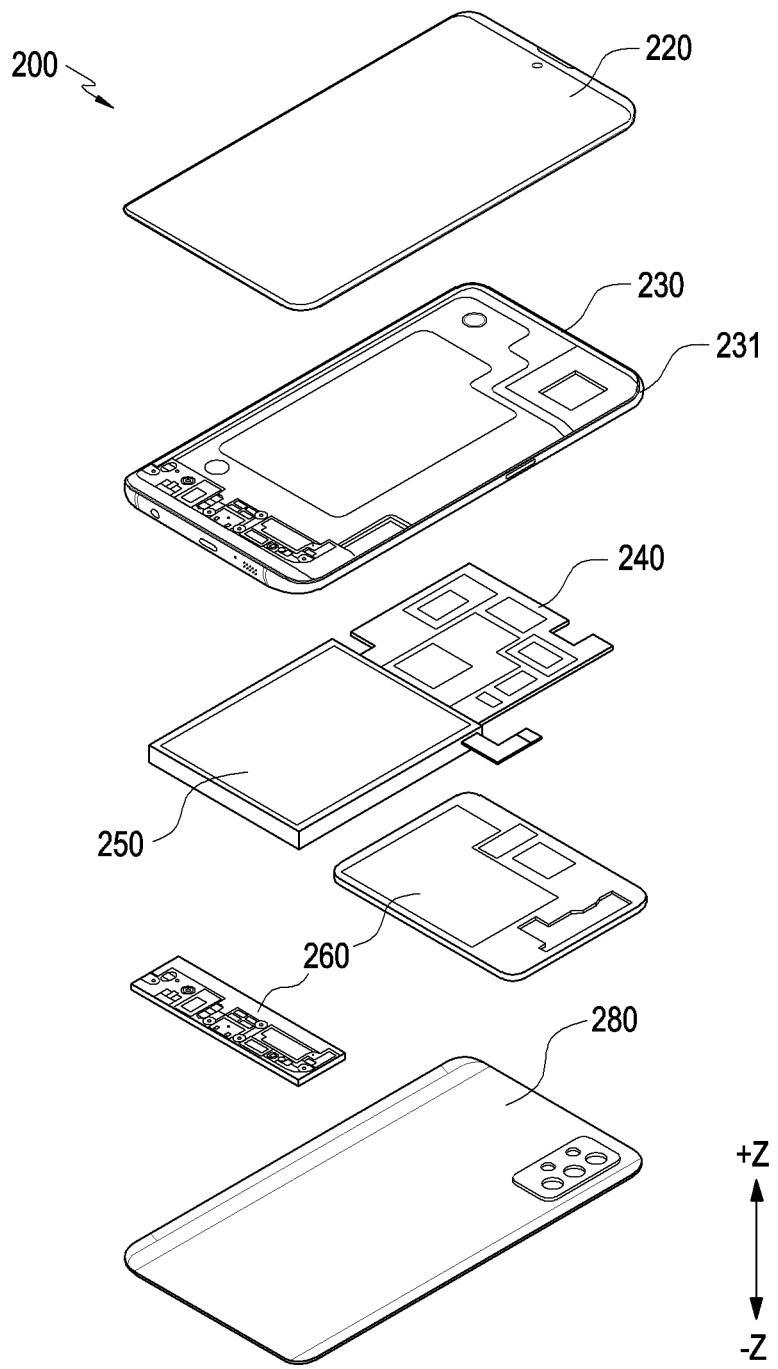
FIG. 4 is an exploded perspective view of an electronic device according to an embodiment of the disclosure.

FIG. 4 is an exploded perspective view of an electronic device according to an embodiment of the disclosure.

Referring to FIG. 4, an electronic device 200 (e.g., the electronic device 200 in FIGS. 2 and 3) may include at least one of a display 220 (e.g., the display 220 in FIG. 2), a support member 230 (e.g., a bracket), a printed circuit board 240, a battery 250, a rear support member 260 (e.g., a rear case), and a rear plate 280 (e.g., the rear plate 211 in FIG. 3). In some embodiments of the disclosure, the electronic device 200 may exclude at least one (e.g., the first support member 232 or the second support member 260) of the elements or further include other elements. At least one of the elements of the electronic device 200 may be the same as or similar to at least one of the elements of the electronic device 200 in FIG. 2 or 3, and duplicate descriptions thereof will be omitted below.

According to an embodiment of the disclosure, the support member 230 may be disposed inside the electronic device 200 to be connected to a side bezel structure 231 or integrally formed with the side bezel structure 231. The support member 230 may be formed of, for example, a metal material and/or a non-metal (e.g., polymer) material. The display 220 may be coupled to one face of the support member 230 and the printed circuit board 240 may be coupled to the other face thereof.

According to an embodiment of the disclosure, a processor, a memory, and/or an interface may be mounted on the printed circuit board 240. The processor may include, one or more of, for example, a central processing unit, an application processor, a graphics processing unit, an image signal processor, a sensor hub processor, or a communication processor. According to an embodiment of the disclosure, the memory may include, for example, volatile memory or non-volatile memory. According to an embodiment of the disclosure, the interface may include, for example, a high-definition multimedia interface (HDMI), a universal serial bus (USB) interface, an SD card interface, and/or an audio interface. The interface may electrically or physically connect the electronic device 200 to an external electronic device and include a USB connector, an SD card/multimedia card (MMC) connector, or an audio connector.

According to an embodiment of the disclosure, the battery 250 is a device for supplying power to at least one element (e.g., the display 220) of the electronic device 200, and may include, for example, a non-rechargeable primary battery, rechargeable secondary battery, or a fuel cell. At least a portion of the battery 250 may be disposed on, for example, a substantially coplanar surface with the printed circuit board 240. The battery 250 may be integrally disposed inside the electronic device 200 or disposed to be attachable to or detachable from the electronic device 200.

According to an embodiment of the disclosure, the rear support member 260 (e.g., a rear case) may be disposed between the printed circuit board 240 and the rear plate 280. For example, the rear support member 260 may include one face to which at least one of the printed circuit board 240 or the battery 250 is coupled, and the other face to which the rear plate 280 is coupled.

According to an embodiment of the disclosure, the electronic device 200 may include an antenna (not shown). For example, the electronic device 200 may include a near-field communication (NFC) antenna, a wireless charging antenna, and/or a magnetic secure transmission (MST) antenna. For example, the antenna may perform short-range communication with an external device or wirelessly transmit/receive power required for charging. For example, the antenna may include a coil for wireless charging. In another embodiment of the disclosure, an antenna structure may be formed by a part of the side bezel structure 231 and/or the support member 230 or a combination thereof.

Although the electronic device 200 disclosed in FIGS. 2 to 4 has a bar-type or plate-type appearance, various embodiments of the disclosure are not limited thereto. For example, the illustrated electronic device may be a rollable electronic device or a foldable electronic device. A "rollable electronic device" may indicate an electronic device in which a display (e.g., the display 220 in FIG. 4) is able to be bent or deformed so that at least a portion thereof is wound or rolled, or received inside the housing 210 (e.g., the housing 210 in FIG. 2). The rollable electronic device may be unrolled or a larger area of the display may be exposed to the outside according to the needs of a user, thereby expanding the screen display area for use. A "foldable electronic device" may indicate an electronic device that is able to be folded such that two different areas of a display face each other or in opposite directions to each other. In general, a display of the foldable electronic device may be folded such that two different areas thereof face each other or in opposite directions when it is carried, and may be unfolded when it is used by the user such that two different areas form a substantially flat plate. In some embodiments of the disclosure, the electronic device 200 according to various embodiments disclosed in this document may be interpreted as including various other electronic devices, such as notebook computers and cameras, as well as portable electronic devices, such as smartphones.

Figure 5:
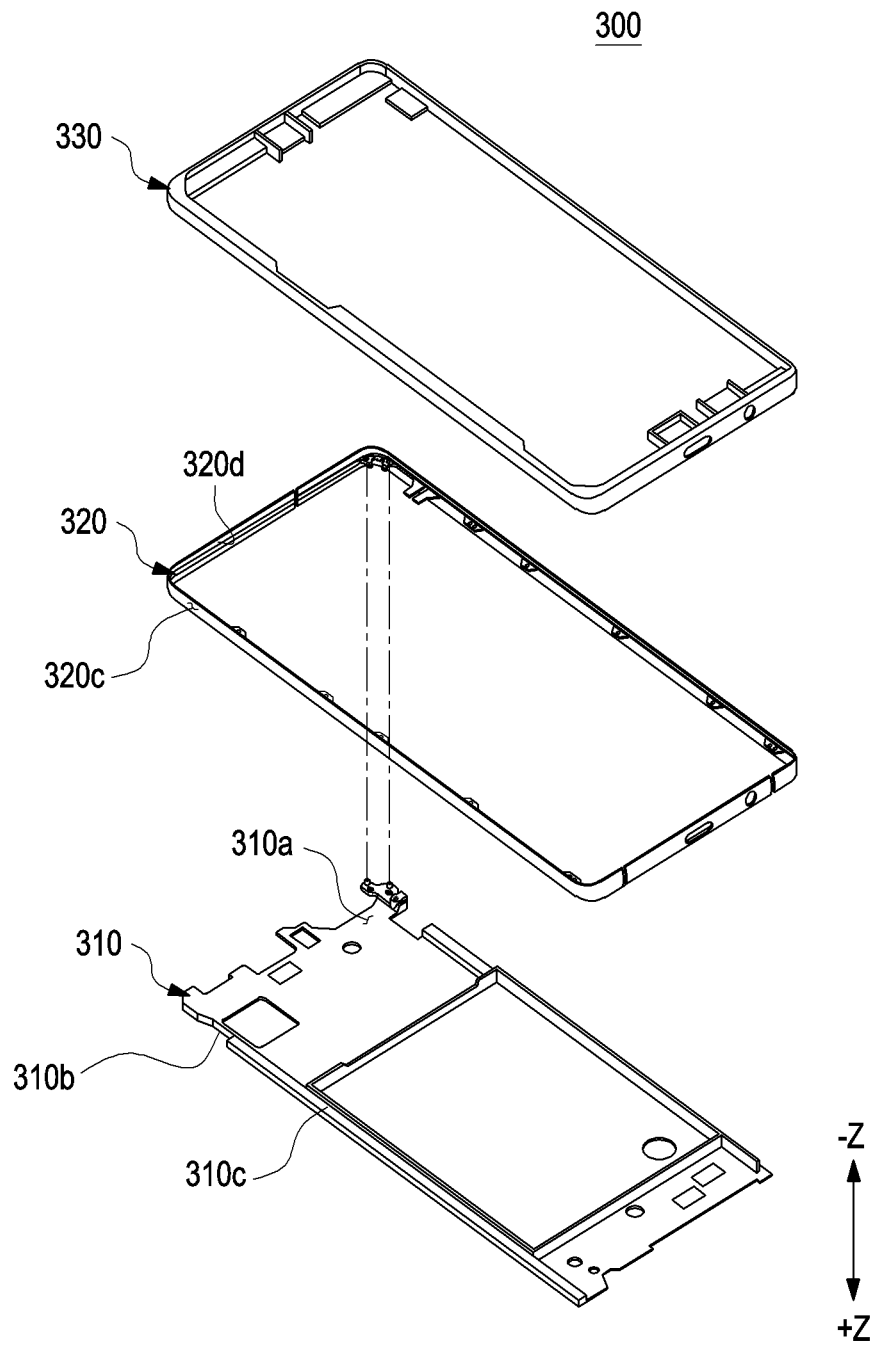
FIG. 5 is an exploded perspective view of a support member according to an embodiment of the disclosure.

FIG. 5 is an exploded perspective view of a support member according to an embodiment of the disclosure.

Figure 6:
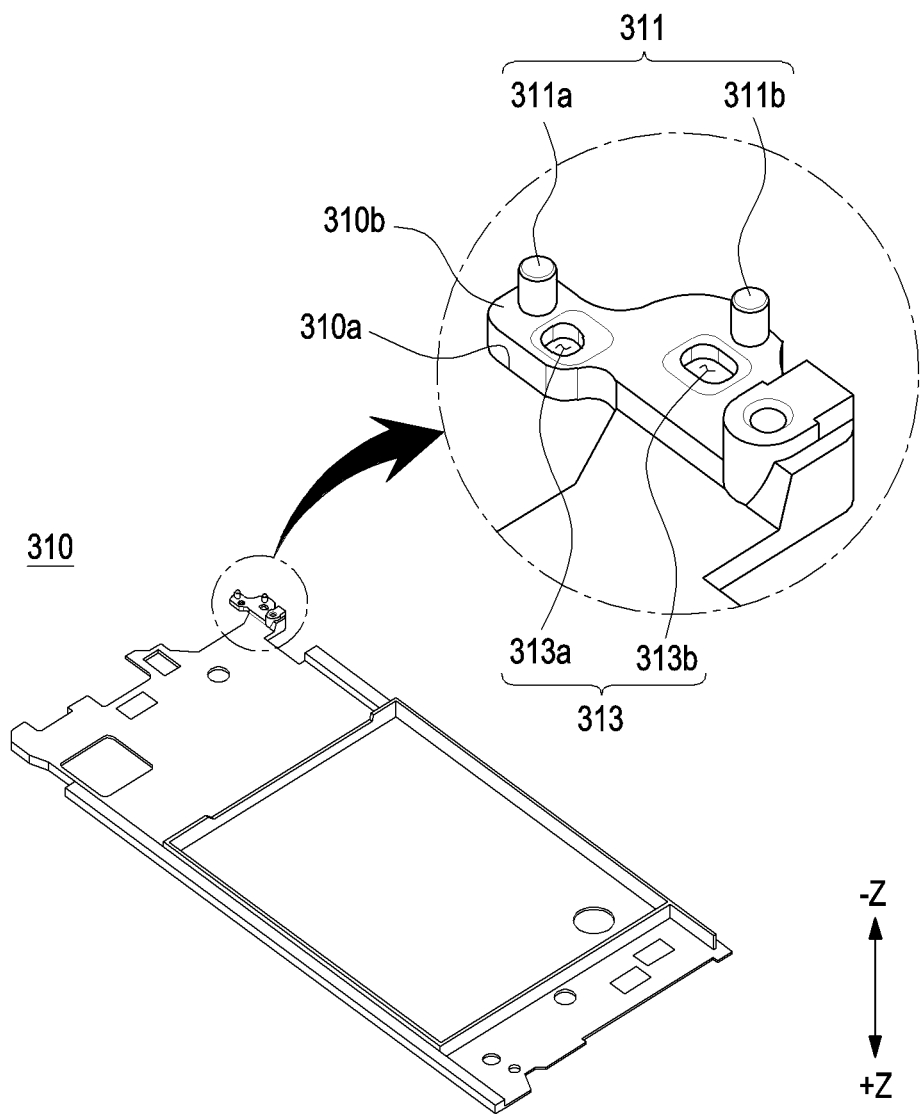
FIG. 6 is a perspective view of a first metal member according to an embodiment of the disclosure.

FIG. 6 is a perspective view of a first metal member according to an embodiment of the disclosure.

Figure 7:
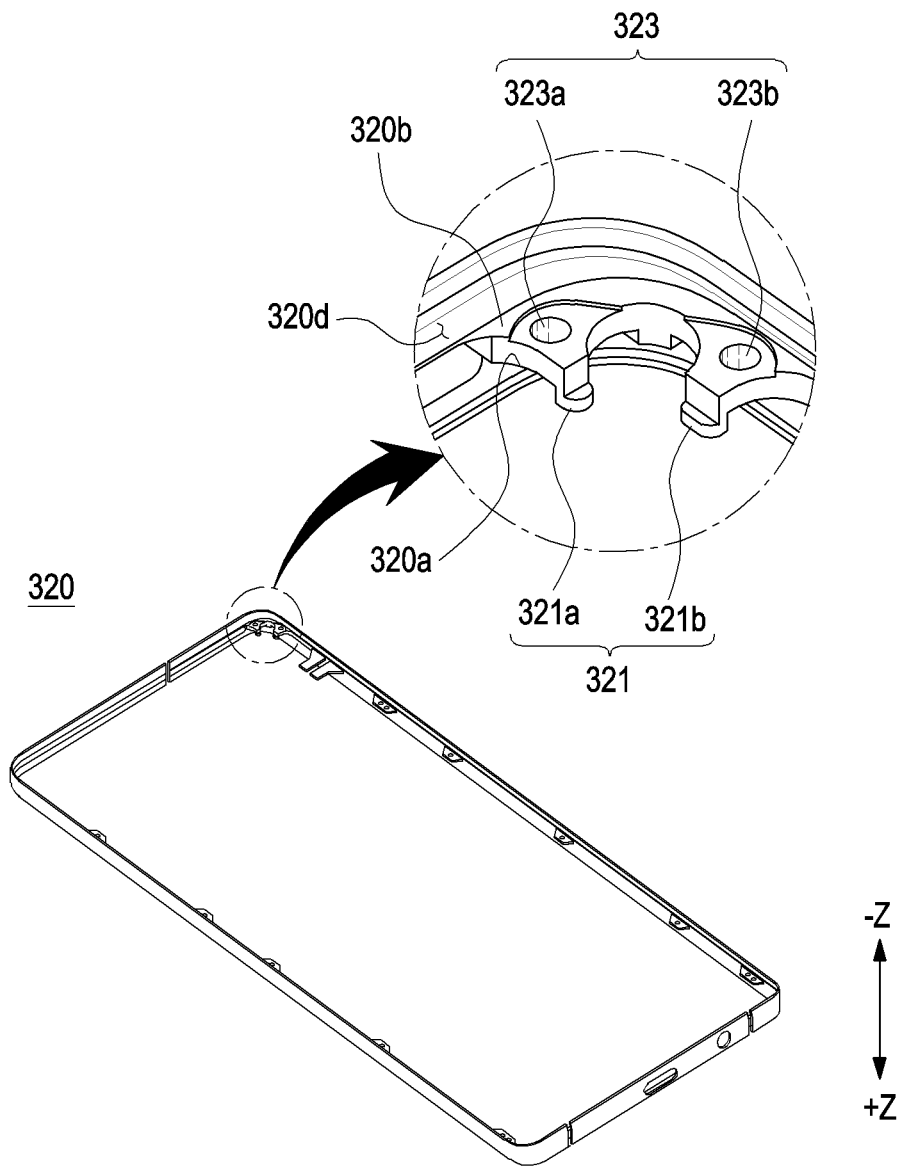
FIG. 7 is a perspective view of a second metal member according to an embodiment of the disclosure.

FIG. 7 is a perspective view of a second metal member according to an embodiment of the disclosure.

Referring to FIGS. 5 to 7, a support member 300 may include a first metal member 310, a second metal member 320, and/or a non-metal member 330. All or some of configurations of the support member 300 and the second metal member 320 in FIG. 5 may be the same as those of the support member 230 and the side bezel structure 231 in FIG. 4.

According to various embodiments of the disclosure, the first metal member 310 may support components (e.g., the display 220 and/or the printed circuit board 240 in FIG. 4) of an electronic device (e.g., the electronic device 200 in FIG. 2). According to an embodiment of the disclosure, the first metal member 310 may include a $(1\text{-}1)^{th}$ metal member surface 310a facing at least a portion of the display 220, a $(1\text{-}2)^{th}$ metal member surface 310b facing the printed circuit board 240, and a 1-3rd metal member surface 310c surrounding at least a portion between the $(1\text{-}1)^{th}$ metal member surface 310a and the $(1\text{-}2)^{th}$ metal member surface 320a. According to an embodiment of the disclosure, the $(1\text{-}1)^{th}$ metal member surface 310a may be interpreted as a front surface of the first metal member 310, and the $(1\text{-}2)^{th}$ metal member surface 310b may be interpreted as a rear surface of the first metal member 310, and the 1-3rd metal member surface 310c may be interpreted as a side surface of the first metal member 310. According to an embodiment of the disclosure, the first metal member 310 may be interpreted as an inner metal.

According to various embodiments of the disclosure, the second metal member 320 may surround at least a portion of the first metal member 310. According to an embodiment of the disclosure, the second metal member 320 may include a $(2\text{-}2)^{th}$ metal member surface 320a facing the $(1\text{-}2)^{th}$ metal member surface 310b of the first metal member 310, a $(2\text{-}3)^{th}$ metal member surface 320b opposite the $(2\text{-}2)^{th}$ metal member surface 320a, and a $(2\text{-}1)^{th}$ metal member surface 320d positioned between the $(2\text{-}2)^{th}$ metal member surface 320a and the $(2\text{-}3)^{th}$ metal member surface 320b. The $(2\text{-}1)^{th}$ metal member surface 320d may face the 1-3rd metal member surface 310c of the first metal member 310. According to an embodiment of the disclosure, the second metal member 320 may form at least a part of an edge of an electronic device (e.g., the electronic device 200 in FIG. 2) and/or the support member 300. For example, the second metal member 320 may include a 2-4th metal member surface 320c forming at least a portion of an outer surface of the support member 300. According to an embodiment of the disclosure, the second metal member 320 may be interpreted as the side bezel structure 231 in FIG. 4 or an outer metal.

According to an embodiment of the disclosure, the $(2\text{-}1)^{th}$ metal member surface 320d may be interpreted as an inner surface of the second metal member 320, the $(2\text{-}2)^{th}$ metal member surface 320a may be interpreted as a front surface of the second metal member 320, the $(2\text{-}3)^{th}$ metal member surface 320b may be interpreted as a rear surface of the second metal member 320, and the 2-4th metal member surface 320c may be interpreted as an outer surface of the second metal member 320.

According to various embodiments of the disclosure, at least a part of the second metal member 320 may be used as an antenna. According to an embodiment of the disclosure, a communication module (e.g., the communication module 190 in FIG. 1) positioned on a printed circuit board (e.g., the printed circuit board 240 in FIG. 4) may transmit or receive wireless signals using the second metal member 320. According to an embodiment of the disclosure, the first metal member 310 and/or the second metal member 320 may be formed of a conductive material. For example, the first metal member 310 and/or the second metal member 320 may include at least one of aluminum (Al), stainless steel, or titanium (Ti).

According to various embodiments of the disclosure, the first metal member 310 may include at least one first protrusion 311. According to an embodiment of the disclosure, the first metal member 310 may be connected or coupled to the second metal member 320 using the first protrusion 311. For example, the first protrusion 311 may be disposed in a second through-hole 323 of the second metal member 320 and bonded (e.g., welded) to the second metal member 320. According to an embodiment of the disclosure, the first protrusion 311 may include a plurality of protrusions 311a and 311b. For example, the first protrusion 311 may include a $(1\text{-}1)^{th}$ protrusion 311a and a $(1\text{-}2)^{th}$ protrusion 311b spaced apart from the $(1\text{-}1)^{th}$ protrusion 311a. According to an embodiment of the disclosure, the first protrusion 311 may be positioned adjacent to a corner of the first metal member 310.

According to various embodiments of the disclosure, the first metal member 310 may include at least one first through-hole 313. According to an embodiment of the disclosure, the first through-hole 313 may accommodate a second protrusion 321 of the second metal member 320. According to an embodiment of the disclosure, the first through-hole 313 may be an empty space formed between the $(1\text{-}1)^{th}$ metal member surface 310a and the $(1\text{-}2)^{th}$ metal member surface 310b. According to an embodiment of the disclosure, the first through-hole 313 may include a plurality of through-holes 313a and 313b. For example, the first through-hole 313 may include a first through-hole 313a for accommodating a $(2-1)^{th}$ protrusion 321a and a $(1-2)^{th}$ through-hole 313b for accommodating a $(2-2)^{th}$ protrusion 321b.

According to various embodiments of the disclosure, the second metal member 320 may include at least one second protrusion 321. According to an embodiment of the disclosure, the second metal member 320 may be connected or coupled to the first metal member 310 using the second protrusion 321. For example, the second protrusion 321 may be disposed in the first through-hole 313 of the first metal member 310 and bonded (e.g., welded) to the first metal member 310. According to an embodiment of the disclosure, the second protrusion 321 may include a plurality of protrusions 321a and 321b. For example, the second protrusion 321 may include a $(2-1)^{th}$ protrusion 321a and a $(2-2)^{th}$ protrusion 321b spaced apart from the $(2-1)^{th}$ protrusion 321a.

According to various embodiments of the disclosure, the second metal member 320 may include at least one second through-hole 323. According to an embodiment of the disclosure, the second through-hole 323 may accommodate the first protrusion 311 of the first metal member 310. According to an embodiment of the disclosure, the second through-hole 323 may be an empty space formed between the $(2-2)^{th}$ metal member surface 320a and the $(2-3)^{th}$ metal member surface 320b. According to an embodiment of the disclosure, the second through-hole 323 may include a plurality of through-holes 323a and 323b. For example, the second through-hole 323 may include a $(2-1)^{th}$ through-hole 323a for accommodating the $(1-1)^{th}$ protrusion 311a and a $(2-2)^{th}$ through-hole 323b for accommodating the $(1-2)^{th}$ protrusion 311b.

According to an embodiment of the disclosure, the first metal member 310 and the second metal member 320 may be coupled using the first protrusion 311, the first through-hole 313, the second protrusion 321, and the second through-hole 323.

According to various embodiments of the disclosure, the non-metal member 330 may surround at least a portion of a space between the first metal member 310 and the second metal member 320. According to an embodiment of the disclosure, at least a portion of the non-metal member 330 may be disposed between the first metal member 310 and the second metal member 320. According to an embodiment of the disclosure, the non-metal member 330 may be substantially formed of a non-conductive material. For example, the non-metal member 330 may include resin. According to an embodiment of the disclosure, the non-metal member 330 may form a part of an edge of an electronic device (e.g., the electronic device 200 in FIG. 2). According to an embodiment of the disclosure, the non-metal member 330 may reduce loss of electromagnetic waves received or transmitted by an antenna module (e.g., the antenna module 197 in FIG. 1) through the second metal member 320. For example, the non-metal member 330 may reduce or prevent eddy current flowing through the second metal member 320. According to an embodiment (not shown) of the disclosure, the support member 300 may not include the non-metal member 330.

Figure 8A:
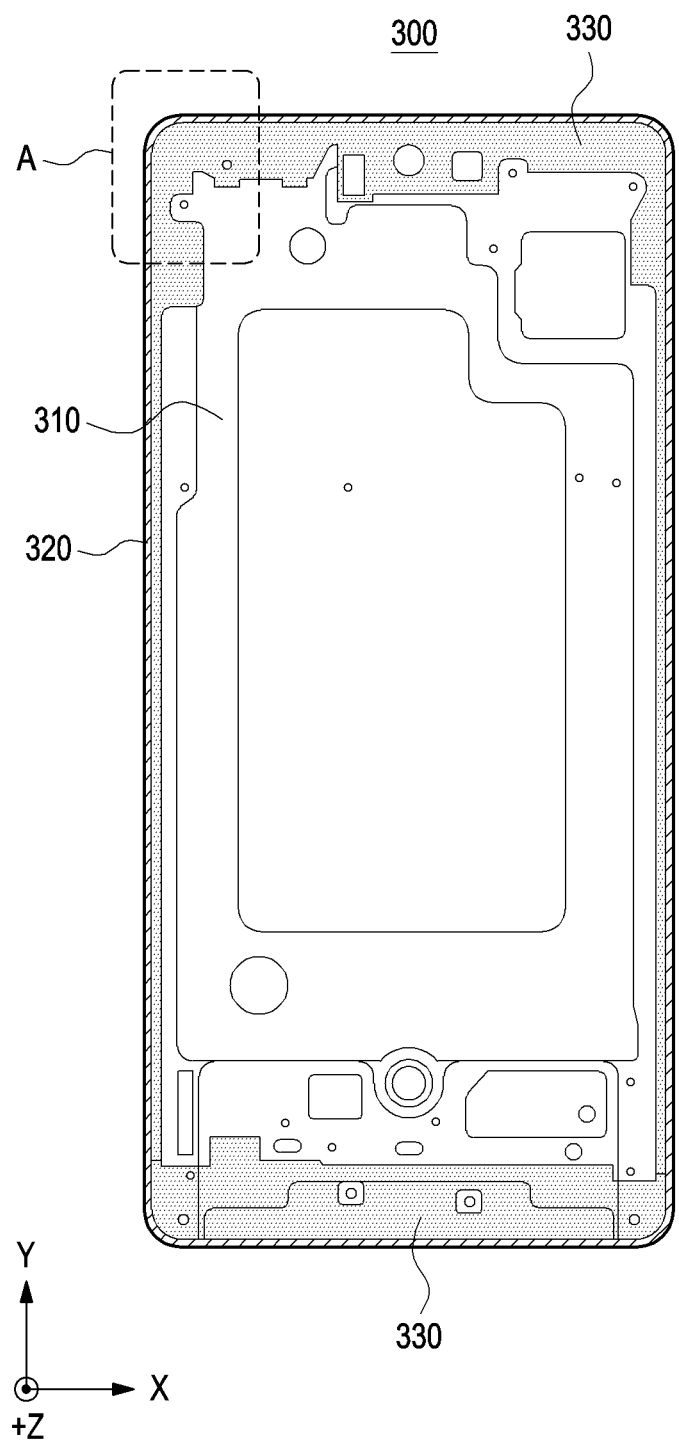
FIG. 8A is a front view of a support member according to an embodiment of the disclosure.

FIG. 8A is a front view of a support member according to an embodiment of the disclosure.

Figure 8B:
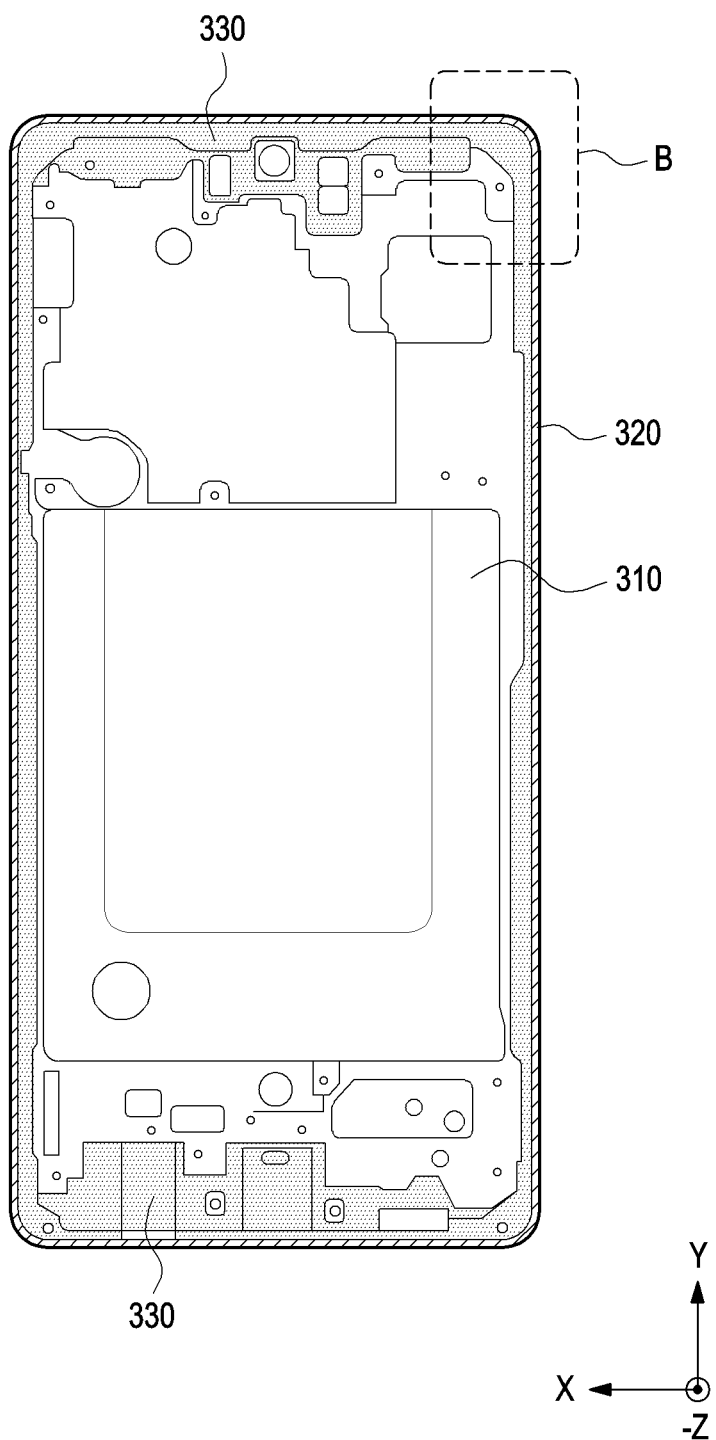
FIG. 8B is a rear view of a support member according to an embodiment of the disclosure.

FIG. 8B is a rear view of a support member according to an embodiment of the disclosure.

Figure 9:
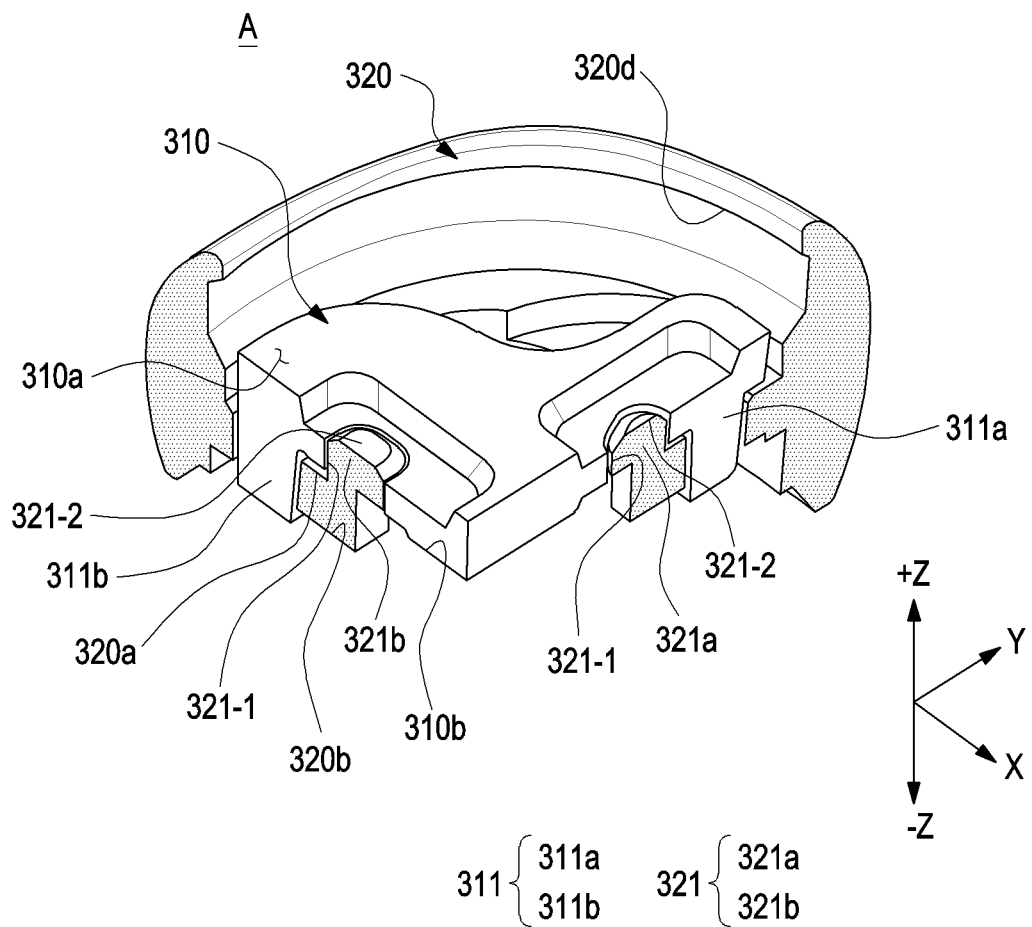
FIG. 9 is a cross-sectional perspective view of an area A in FIG. 8A according to an embodiment of the disclosure.

FIG. 9 is a cross-sectional perspective view of an area A in FIG. 8A according to an embodiment of the disclosure.

Figure 10:
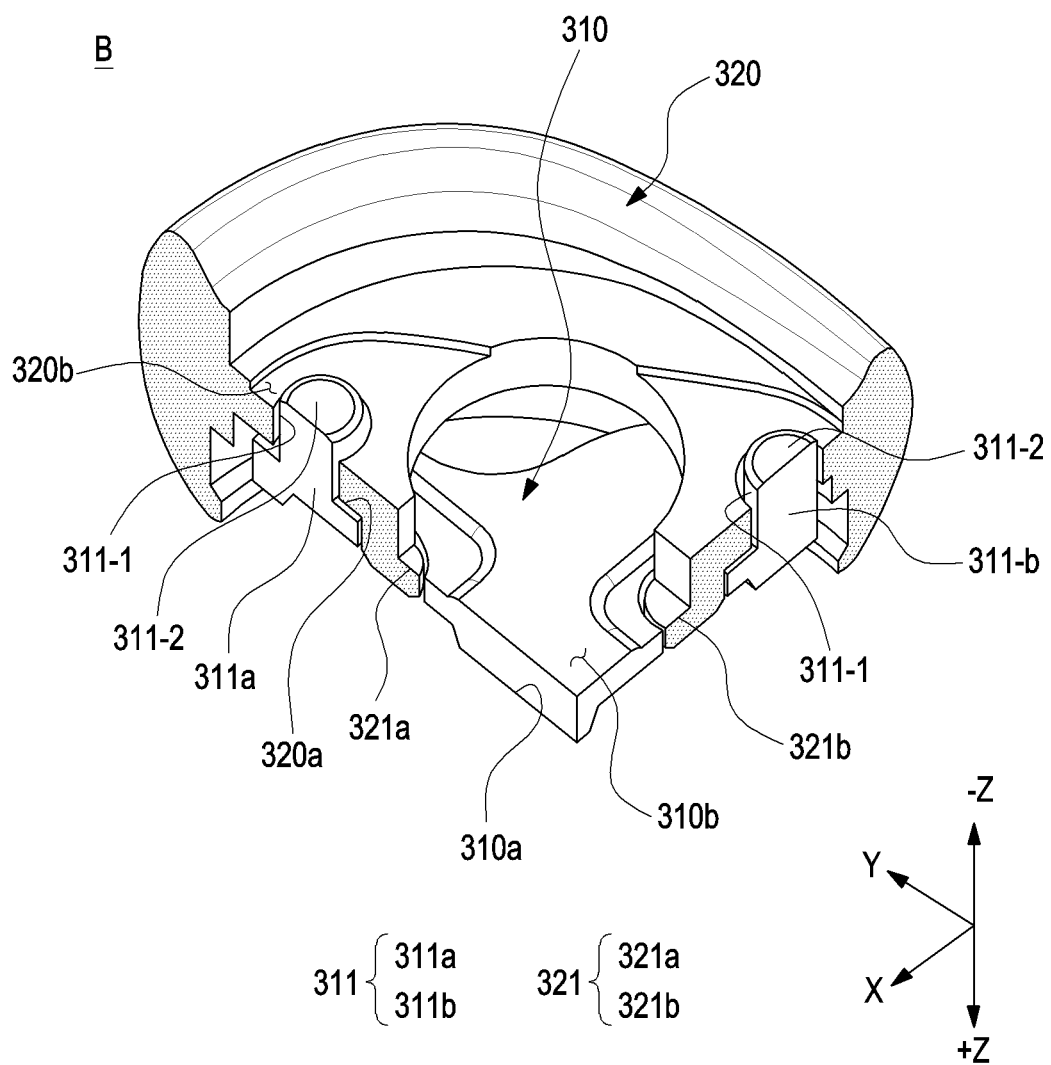
FIG. 10 is a cross-sectional perspective view of an area B in FIG. 8B according to an embodiment of the disclosure.

FIG. 10 is a cross-sectional perspective view of an area B in FIG. 8B according to an embodiment of the disclosure.

Referring to FIGS. 8A, 8B, 9, and 10, the support member 300 may include a first metal member 310, a second metal member 320, and a non-metal member 330. According to an embodiment of the disclosure, the first metal member 310 and the second metal member 320 may be coupled by welding, and the non-metal member 330 may be fitted (interference fit) into the space between the first metal member 310 and the second metal member 320. According to an embodiment of the disclosure, the non-metal member 330 may be insert-injected together with the first metal member 310 and/or the second metal member 320.

All or some of the configurations of the first metal member 310, the second metal member 320, and the non-metal member 330 in FIGS. 8A, 8B, 9, and 10 may be the same as the configurations of the first metal member 310, the second metal member 320, and the non-metal member 330 in FIGS. 5 to 7.

According to various embodiments of the disclosure, the first metal member 310 and the second metal member 320 may be engaged and coupled. According to an embodiment (e.g., FIG. 9 or 10) of the disclosure, the first protrusion 311 may be formed on the $(1-2)^{th}$ metal member surface 310b of the first metal member 310, and the second protrusion 321 may be formed on the $(2-2)^{th}$ metal member surface 320a of the second metal member 320. For example, the first protrusion 311 may protrude downwards (e.g., in the −Z direction) from the $(1-2)^{th}$ metal member surface 310b, and the second protrusion 321 may protrude upwards (e.g., in the +Z direction) from the $(2-2)^{th}$ metal member surface 320a. According to an embodiment (not shown) of the disclosure, the first protrusion 311 may be formed on the $(1-1)^{th}$ metal member surface 310a of the first metal member 310, and the second protrusion 321 may be formed on the $(2-3)^{th}$ metal member surface 320b of the second metal member 320. For example, the first protrusion 311 may protrude upwards (e.g., in the +Z direction) from the $(1-1)^{th}$ metal member surface 310a, and the second protrusion 321 may protrude downwards (e.g., in the −Z direction) from the $(2-3)^{th}$ metal member surface 320b.

According to various embodiments of the disclosure, the first protrusion 311 may be inserted into a second through-hole (e.g., the second through-hole 323 in FIG. 7). For example, the first protrusion 311 may include a $(1-1)^{th}$ protrusion surface 311-1 facing the second through-hole 323, and a $(1-2)^{th}$ protrusion surface 311-2 extending from the $(1-1)^{th}$ protrusion surface 311-1 and having at least a portion thereof exposed to the outside of the support member 300. According to an embodiment of the disclosure, the $(1-1)^{th}$ protrusion surface 311-1 may be interpreted as a side surface of the first protrusion 311, and the $(1-2)^{th}$ protrusion surface 311-2 may be interpreted as an upper surface of the first protrusion 311.

According to various embodiments of the disclosure, the second protrusion 321 may be inserted into a first through-hole (e.g., the first through-hole 313 in FIG. 6). For example, the second protrusion 321 may include a $(2-1)^{th}$ protrusion surface 321-1 facing the first through-hole 313, and a $(2-2)^{th}$ protrusion surface 321-2 extending from the $(2-1)^{th}$ protrusion surface 321-1 and having at least a portion thereof exposed to the outside of the support member 300. According to an embodiment of the disclosure, the $(2-1)^{th}$ protrusion surface 321-1 may be interpreted as a side surface of the second protrusion 321, and the $(2-2)^{th}$ protrusion surface 321-2 may be interpreted as an upper surface of the second protrusion 321.

Figure 11:
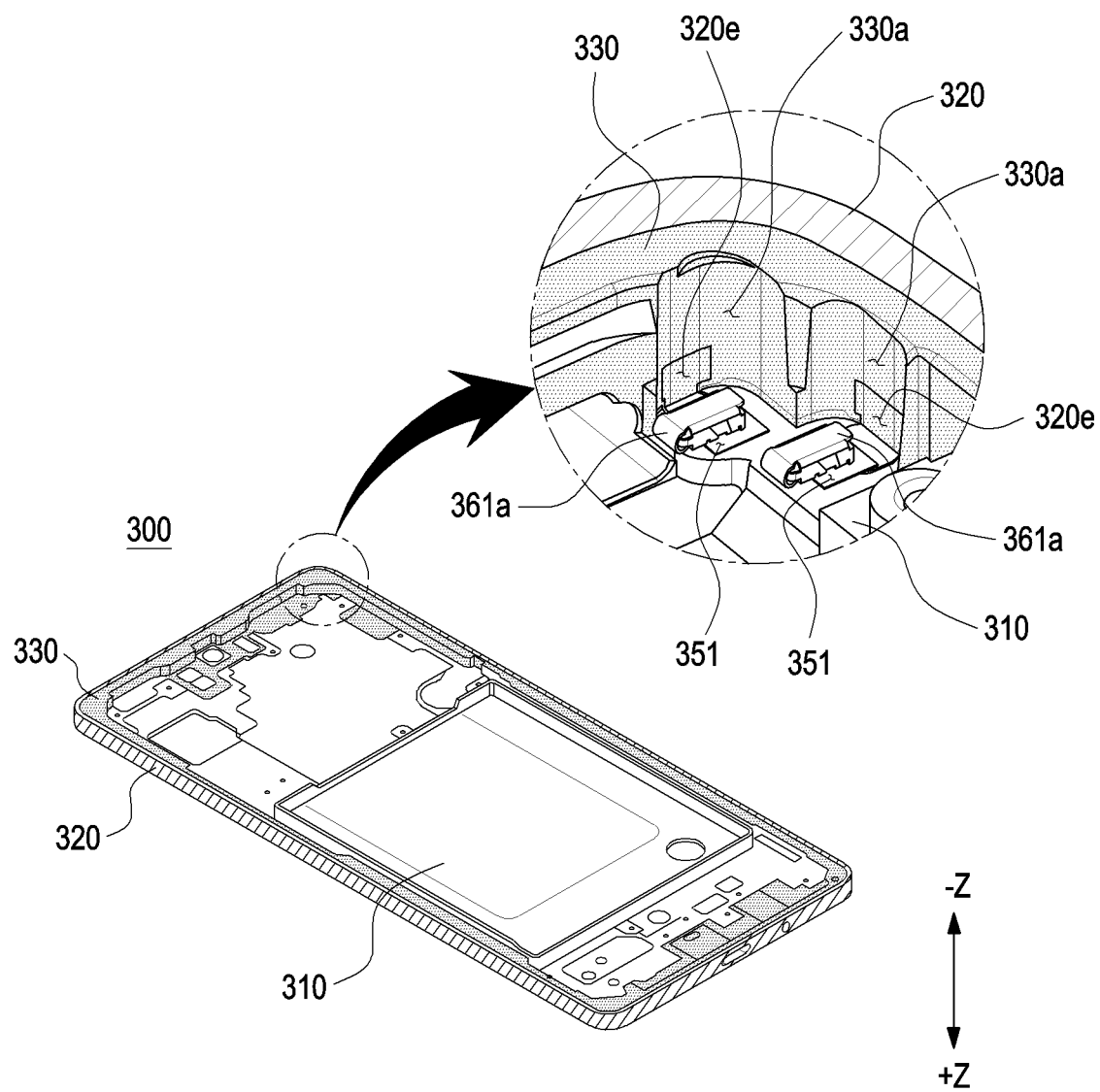
FIG. 11 is a perspective view of a support member connected to a connection terminal according to an embodiment of the disclosure.

FIG. 11 is a perspective view of a support member connected to a connection terminal according to an embodiment of the disclosure.

Figure 12:
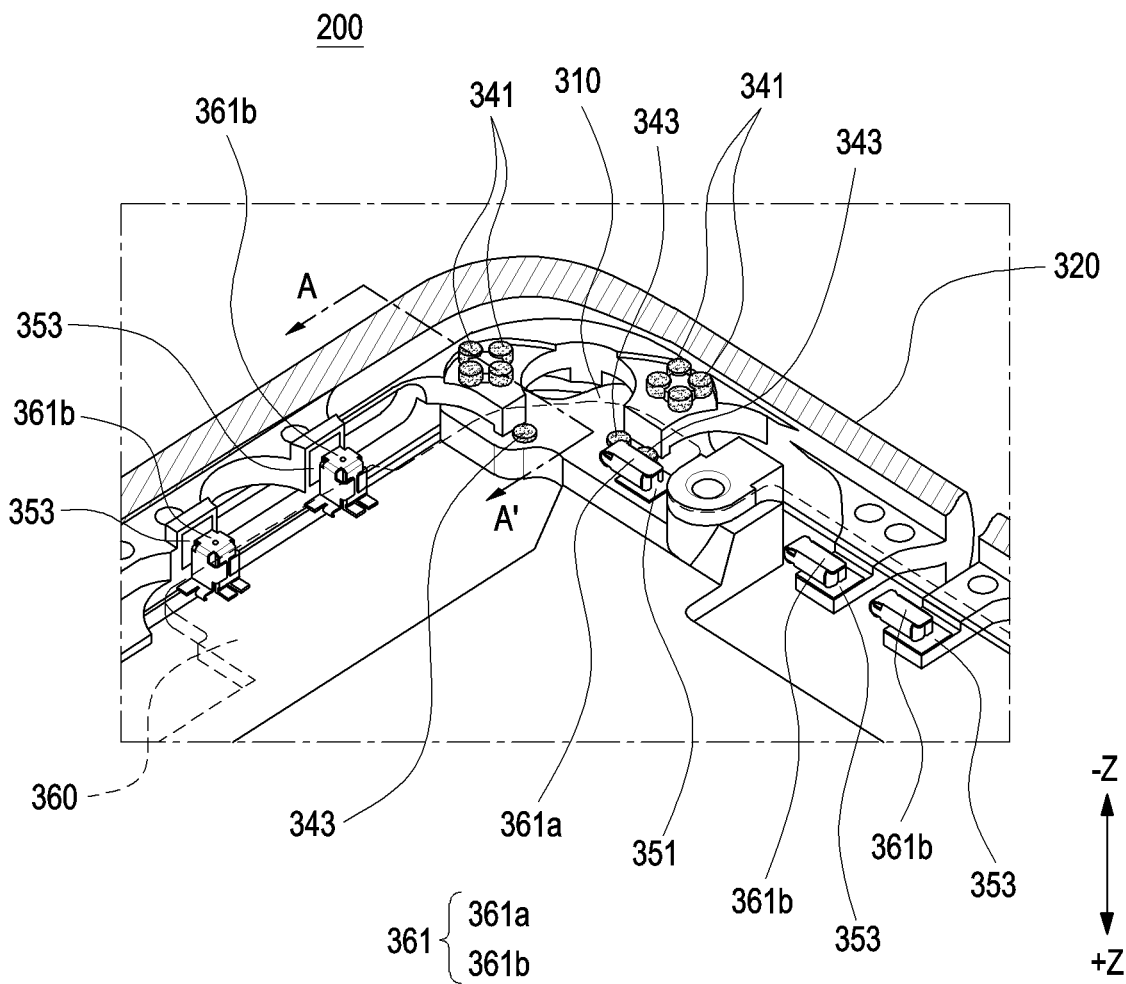
FIG. 12 is a perspective view of an electronic device including a support member and a printed circuit board according to an embodiment of the disclosure.

FIG. 12 is a perspective view of an electronic device including a support member and a printed circuit board according to an embodiment of the disclosure.

Figure 13:
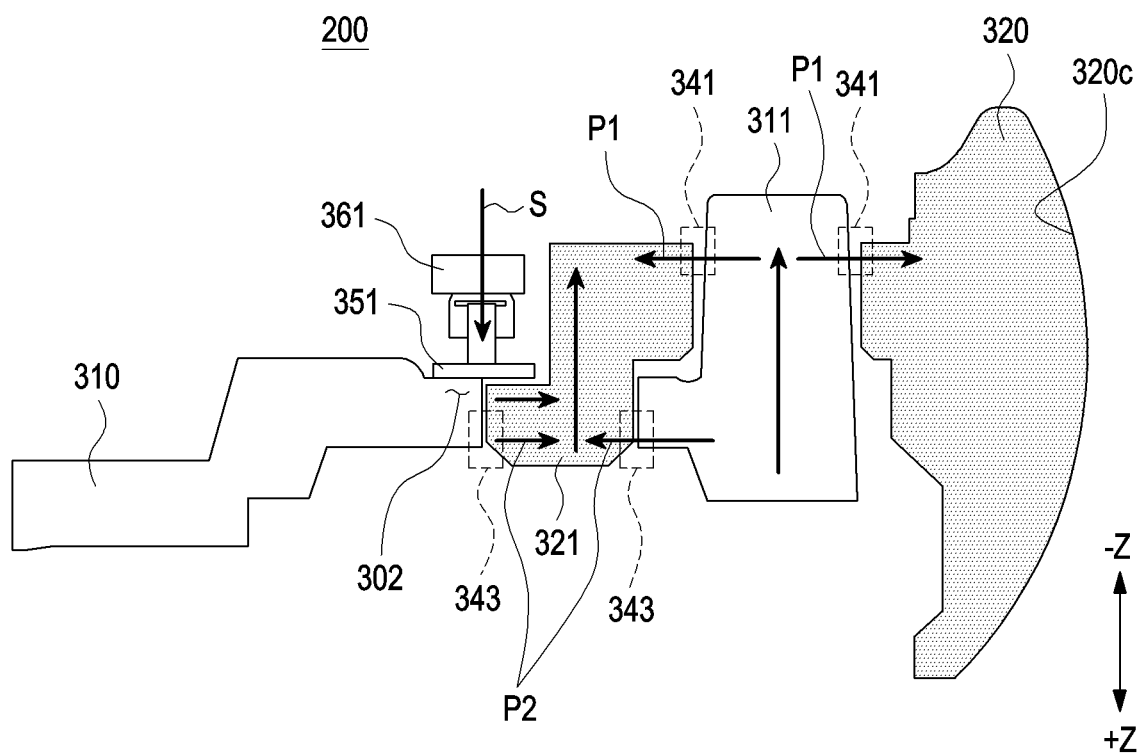
FIG. 13 is a cross-sectional view taken along line A-A' in FIG. 12 according to an embodiment of the disclosure.

FIG. 13 is a cross-sectional view taken along line A-A' in FIG. 12 according to an embodiment of the disclosure.

Referring to FIGS. 11 to 13, the electronic device 200 may include a printed circuit board 360 electrically connected to a support member 300. All or some of the configurations of the support member 300 in FIGS. 11 to 13 may be the same as the configurations of the support member 300 in FIG. 5, and all or some of the configurations of the printed circuit board 360 in FIGS. 11 to 13 may be the same as the configurations of the printed circuit board 360 in FIG. 5.

According to various embodiments of the disclosure, the first metal member 310 may be coupled or bonded to the second metal member 320. According to an embodiment of the disclosure, the support member 300 of the electronic device 200 may include a first solder 341 connected to the first protrusion 311 of the first metal member 310 and the second metal member 320, and a second solder 343 connected to the second protrusion 321 of the second metal member 320 and the first metal member 310. According to an embodiment of the disclosure, the first metal member 310 and the second metal member 320 may be coupled from both sides. For example, the first solder 341 may be disposed or positioned in a direction different from that of the second solder 343, based on a connection area 302 and/or a first metal sheet 351. According to an embodiment of the disclosure, the first solder 341 may be positioned below the connection area 302 (e.g., in the −Z direction), and the second solder 343 is positioned above the connection area 302 (e.g., in the +Z direction). According to an embodiment of the disclosure, at least a portion of the first solder 341 may be positioned on the rear surface (e.g., the $(1\text{-}2)^{th}$ metal member surface 310b of the first metal member 310 in FIG. 6 and/or the $(2\text{-}3)^{th}$ metal member surface 320b of the $2^{nd}$ metal member 320 in FIG. 7) of the support member 300, and at least a portion of the second solder 343 may be positioned on the front surface (e.g., the $(1\text{-}1)^{th}$ metal member surface 310a of the first metal member 310 in FIG. 6 and/or the $(2\text{-}2)^{th}$ metal member surface 320a of the second metal member 320 in FIG. 7) of the support member 300. According to an embodiment of the disclosure, the first solder 341 and/or the second solder 343 may be interpreted as solder. According to an embodiment of the disclosure, the connection area 302 is a path through which a wireless signal S passes, and may be an area of the support member 300 for accommodating the first metal sheet 351. For example, the connection area 302 may be an area of the support member 300 facing the first metal sheet 351 and/or a connection terminal 361.

According to an embodiment of the disclosure, at least a portion of the first solder 341 may be positioned in the second through-hole 323 of the second metal member 320. For example, at least a portion of the first solder 341 may be disposed on a $(1\text{-}1)^{th}$ protrusion member surface 311a and a $(1\text{-}2)^{th}$ protrusion member surface 311b of the first protrusion 311, and/or a portion (e.g., the $(2\text{-}3)^{th}$ metal member surface 320b in FIG. 10) of the second metal member 320.

According to an embodiment of the disclosure, at least a portion of the second solder 343 may be positioned in the first through-hole 313 of the first metal member 310. For example, at least a portion of the second solder 343 may be disposed on a $(2\text{-}1)^{th}$ protrusion member surface 321a and the $(2\text{-}2)^{th}$ protrusion member surface 321b of the second protrusion 321, and/or a portion (e.g., the $(1\text{-}1)^{th}$ metal member surface 310a in FIG. 9) of the first metal member 320.

According to various embodiments of the disclosure, the electronic device 200 may use at least a portion of the support member 300 as an antenna. According to an embodiment of the disclosure, in the electronic device 200, a communication module (e.g., the communication module 190 in FIG. 1) positioned on the printed circuit board 360 may transmit or receive wireless signals using the support member 300. For example, electrical signals generated by the communication module 190 may pass through the first metal member 310 and/or the second metal member 320 to be transmitted to the outside of the electronic device 200.

According to various embodiments of the disclosure, the electronic device 200 may include at least one first metal sheet 351. According to an embodiment of the disclosure, at least a portion of the first metal sheet 351 may be disposed on the first metal member 310 and the second metal member 320. For example, a portion of the first metal member 310, a portion of the second metal member 320, and a portion of the non-metal member 330 of the support member 300 may form a substantially flat surface by a cutting process (e.g., a computer numerical control (CNC) process), and the first metal sheet 351 may be disposed on the cut-processed surface of the support member 300. According to an embodiment of the disclosure, at least a portion of the first metal sheet 351 may be disposed on the $(1\text{-}2)^{th}$ metal member surface 310b of the first metal member 310 and the $(2\text{-}2)^{th}$ metal member surface 320a of the second metal member 320, and/or the non-metal member 330.

According to various embodiments of the disclosure, the support member 300 may be electrically connected to the printed circuit board 360 using the first metal sheet 351. For example, the first metal sheet 351 may be ultrasonically welded to the first metal member 310 and the second metal member 320, and the connection terminal 361 of the printed circuit board 360 may come into contact with the first metal sheet 351. According to an embodiment of the disclosure, even if at least a portion (e.g., 343 or 341) of the first metal member 310 and the second metal member 320 are separated apart due to welding defects, the wireless signal S transmitted from the connection terminal 361 may pass through the first metal sheet 351 to reach the second metal member 320.

According to various embodiments of the disclosure, the electronic device 200 may include a second metal sheet 353. According to an embodiment of the disclosure, the second metal sheet 353 may be attached to the second metal member 320. For example, the second metal sheet 353 may be ultrasonically welded to an inner surface (e.g., the $(2\text{-}1)^{th}$ metal member surface 320d in FIG. 5) of the second metal member 320. According to an embodiment of the disclosure, the second metal sheet 353 may be connected to the connection terminal 361 of the printed circuit board 360. According to an embodiment of the disclosure, a wireless signal transmitted from a communication module (e.g., the communication module 190 in FIG. 1) may pass through a second terminal 361b of the printed circuit board 360 and the second metal sheet 353 in contact with the second terminal 361b, thereby being transmitted to the second metal member 320.

According to various embodiments of the disclosure, the printed circuit board 360 may include the connection terminal 361 electrically connected to the support member 300. According to an embodiment of the disclosure, the connection terminal 361 may include a first terminal 361a in contact with the first metal sheet 351 and the second terminal 361b in contact with the second metal sheet 353. According to an embodiment of the disclosure, the connection terminal 361 may be disposed on the printed circuit board 360. According to an embodiment of the disclosure, the connection terminal 361 may be interpreted as a connection device (e.g., a connector).

According to various embodiments of the disclosure, a wireless signal S generated by a processor (e.g., the processor 120 in FIG. 1) may be transferred to the second metal member 320. For example, a wireless signal S transmitted from the connection terminal 361 of the printed circuit board 360 to the support member 300 be transmitted to the 2-4th metal member surface 320c of the second metal member 320 by passing through the first solder 341, the second solder 343, and/or the first metal sheet 351.

According to an embodiment of the disclosure, since the first metal member 310 and the second metal member 320 are coupled on both sides, welding joint strength may be increased, and durability of the support member 300 may be enhanced.

According to an embodiment of the disclosure, since the first metal member 310 and the second metal member 320 are coupled on both sides, thereby increasing the electrical contact area and preventing or reducing failure of the antenna of the electronic device 200. For example, the first metal member 310 and the second metal member 320 may be electrically connected using a first path P1 to which the first protrusion 311 and the first solder 341 are connected and a second path P2 to which the second protrusion 321 and the second solder 343 are connected. Since the first metal member 310 and the second metal member 320 are electrically connected at a plurality of points, even if damage occurs at some points, antenna performance using the support member 300 may be maintained.

In the electronic device 200 according to various embodiments of the disclosure, the shapes of the first solder 341 and/or the second solder 343 are slightly exaggerated for detailed description of the disclosure. For example, the thicknesses of the first solder 341 and the second solder 343 may be smaller than the thicknesses of the first solder 341 and the second solder 343 shown in FIG. 12.

Figure 14:
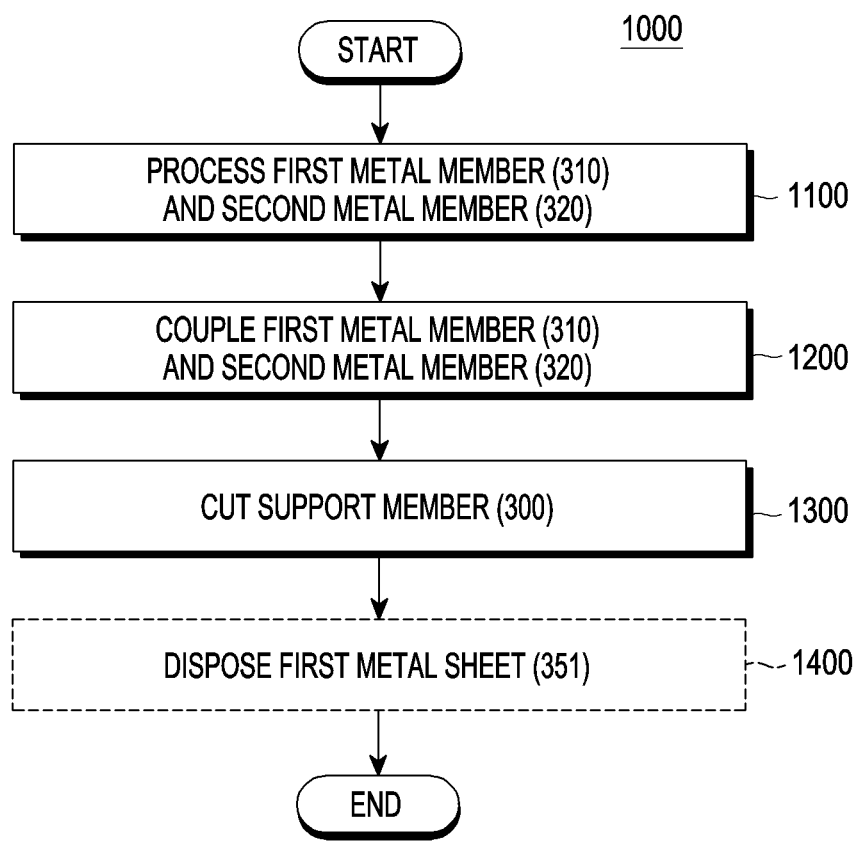
FIG. 14 is a diagram illustrating a manufacturing process of a support member according to an embodiment of the disclosure.

FIG. 14 is a diagram illustrating a manufacturing process of a support member according to an embodiment of the disclosure.

Referring to FIG. 14, a manufacturing process 1000 of an electronic device (e.g., the electronic device 200 in FIG. 2) including a support member 300 may include a process 1100 of processing a first metal member 310 and a second metal member 320, a process 1200 of coupling the first metal member 310 and the second metal member 320, and a process 1300 of cutting the support member 300. All or some of the configurations of the support member 300, the first metal member 310, the second metal member 320, the non-metal member 330, and the first metal sheet 351 in FIG. 14 may be the same as the configurations of the support member 300, the first metal member 310, the second metal member 320, the non-metal member 330, and the first metal sheet 351 shown in FIGS. 11 to 13.

According to various embodiments of the disclosure, the first protrusion 311 and the through-hole 313 of the first metal member 310, and the second protrusion 321 and the second through-hole 323 of the second metal member 320 may be produced using the process 1100 of processing the first metal member 310 and the second metal member 320. According to an embodiment of the disclosure, the process 1100 of processing the first metal member 310 and the second metal member 320 may include at least one of a cutting process (e.g., a CNC process) or an injection mold process. According to an embodiment of the disclosure, the non-metal member 330 may be coupled to at least one of the first metal member 310 and the second metal member 320 using a process (not shown) of disposing the non-metal member 330. According to an embodiment of the disclosure, the non-metal member 330 may be injected into an empty space formed between the first metal member 310 and the second metal member 320.

According to various embodiments of the disclosure, the process 1200 of coupling the first metal member 310 and the second metal member 320 may include a welding process. For example, the first metal member 310 and the second metal member 320 may be coupled using the first solder 341 and the second solder 343. According to an embodiment of the disclosure, the front and rear surfaces of the support member 300 may be welded.

According to various embodiments of the disclosure, the process 1300 of cutting the support member 300 may include cutting a portion of the first metal member 310, the second metal member 320, or the non-metal member (e.g., the non-metal member 330 in FIG. 5). According to an embodiment of the disclosure, the non-metal member 330 and the second metal member 320 may be cut together. For example, one surface (e.g., a 2-5$^{th}$ metal member surface 320e) of the second metal member 320 and one surface (e.g., a 3-1$^{st}$ metal member surface 330a) of the non-metal member 330 may be positioned on substantially the same plane. According to an embodiment of the disclosure, the process 1300 of cutting the support member 300 may indicate forming a seating portion for the first metal sheet 351 to be positioned. For example, at least a portion of one surface (e.g., the (1-2)$^{th}$ metal member surface 310b in FIG. 9) of the first metal member 310 and at least a portion of one surface (the (2-2)$^{th}$ metal member surface 320a in FIG. 10) of the second metal member 320 may be positioned on substantially the same plane. At least a portion of the (1-2)$^{th}$ metal member surface 310b and at least a portion of the (2-2)$^{th}$ metal member surface 320a may be interpreted as a seating portion for the first metal sheet 351 to be positioned.

According to various embodiments of the disclosure, the manufacturing process 1000 of an electronic device (e.g., the electronic device 200 in FIG. 2) may further include a process 1400 of disposing the first metal sheet 351. According to various embodiments of the disclosure, in the process 1400 of disposing the first metal sheet 351, the first metal sheet 351 may be disposed on the first metal member 310 and the second metal member 320. According to an embodiment of the disclosure, the first metal sheet 351 may be ultrasonically welded and attached to the support member 300. For example, the first metal sheet 351 may be attached to at least a portion of the (1-2)$^{th}$ metal member surface 310b and at least a portion of the (2-2)$^{th}$ metal member surface 320a.

According to various embodiments of the disclosure, the manufacturing process 1000 of an electronic device (e.g., the electronic device 200 in FIG. 2) may further include a process (not shown) of inspecting an electrical waveform of the support member 300. For example, it may be identified whether or not the support member 300 is able to produce an electrical path to be used as an antenna of the electronic device 200. According to an embodiment of the disclosure, the connection state between the first metal member 310 and the second metal member 320, the connection state between the first metal member 310 and the first metal sheet 351, and/or the connection state between the second metal member 320 and the first metal sheet 351 may be inspected.

According to various embodiments of the disclosure, an electronic device (e.g., the electronic device 200 in FIG. 2) may include a display (e.g., the display 220 in FIG. 4), a support member (e.g., the support member 300 in FIG. 5), and a printed circuit board (e.g., the printed circuit board 360 in FIG. 12) including at least one terminal (e.g., the connection terminal 361 in FIG. 13) electrically connected to a connection area (e.g., the connection area 302 in FIG. 13) of the support member, wherein the support member may include a first metal member (e.g., the first metal member 310 in FIG. 6) including a first protrusion (e.g., the first protrusion 311 in FIG. 6) and a first through-hole (e.g., the first through-hole 313 in FIG. 6), a second metal member (e.g., the second metal member 320 in FIG. 7) surrounding at least a portion of the first metal member and including a second protrusion (e.g., the second protrusion 321 in FIG. 7) positioned in the first through-hole and a second through-hole (e.g., the second through-hole 323 in FIG. 7) accommodating the first protrusion, a first solder (e.g., the first solder 341 in FIG. 13) connected to the first protrusion and the second metal member, and a second solder (e.g., the second solder 343 in FIG. 13) connected to the second protrusion and the first metal member, and wherein the first solder may be positioned in a direction different from that of the second solder, based on the connection area.

According to various embodiments of the disclosure, the support member may further include a first metal sheet (e.g., the first metal sheet 351 in FIG. 11) disposed on the first metal member and the second metal member and electrically connected to the at least one terminal.

According to various embodiments of the disclosure, the first metal member may include a $(1\text{-}1)^{th}$ metal member surface (e.g., the $(1\text{-}1)^{th}$ metal member surface 310a in FIG. 6) facing the display and a $(1\text{-}2)^{th}$ metal member surface (e.g., the $(1\text{-}2)^{th}$ metal member surface 310b in FIG. 6) opposite the $(1\text{-}1)^{th}$ metal member surface, and the first through-hole may be formed between the $(1\text{-}1)^{th}$ metal member surface and the $(1\text{-}2)^{th}$ metal member surface, and the first protrusion may protrude from the $(1\text{-}2)^{th}$ metal member surface.

According to various embodiments of the disclosure, at least a portion of the second solder may be disposed on the $(1\text{-}1)^{th}$ metal member surface.

According to various embodiments of the disclosure, the second metal member may include a $(2\text{-}1)^{th}$ metal member surface (e.g., the $(2\text{-}1)^{th}$ metal member surface 320d in FIG. 5) surrounding at least a portion of the first metal member, a $(2\text{-}2)^{th}$ metal member surface (e.g., the $(2\text{-}2)^{th}$ metal member surface 320a in FIG. 7) extending from the $(2\text{-}1)^{th}$ metal member surface and facing the $(1\text{-}2)^{th}$ metal member surface of the first metal member, and a $(2\text{-}3)^{th}$ metal member surface (e.g., the $(2\text{-}3)^{th}$ metal member surface 320b in FIG. 7) opposite the $(2\text{-}2)^{th}$ metal member surface, and the second through-hole may be formed between the $(2\text{-}2)^{th}$ metal member surface and the $(2\text{-}3)^{th}$ metal member surface, and the second protrusion may protrude from the $(2\text{-}2)^{th}$ metal member surface.

According to various embodiments of the disclosure, at least a portion of the first solder may be disposed on the $(2\text{-}3)^{th}$ metal member surface.

According to various embodiments of the disclosure, the second metal area may form at least a portion of a side face of the electronic device.

According to various embodiments of the disclosure, the first protrusion may include a $(1\text{-}1)^{th}$ protrusion surface (e.g., the $(1\text{-}1)^{th}$ protrusion surface 311-1 in FIG. 10) facing the second through-hole and a $(1\text{-}2)^{th}$ protrusion surface (e.g., the $(1\text{-}2)^{th}$ protrusion surface 311-2 in FIG. 10) extending from the $(1\text{-}1)^{th}$ protrusion surface and having at least a portion thereof exposed to the outside of the support member, and the second protrusion may include a $(2\text{-}1)^{th}$ protrusion surface (e.g., the $(2\text{-}1)^{th}$ protrusion surface 321-1 in FIG. 9) facing the first through-hole and a $(2\text{-}2)^{th}$ protrusion (e.g., the $(2\text{-}1)^{th}$ protrusion surface 321-1 in FIG. 9) extending from the $(2\text{-}1)^{th}$ protrusion surface and having at least a portion thereof exposed to the outside of the support member.

According to various embodiments of the disclosure, the support member may include a non-metal member (e.g., the non-metal member 330 in FIG. 5) having at least a portion thereof disposed between the first metal member and the second metal member.

According to various embodiments of the disclosure, the electronic device may further include a second metal sheet (e.g., the second metal sheet 353 in FIG. 12) disposed on the second metal member and connected to the at least one terminal of the printed circuit board.

According to various embodiments of the disclosure, a communication module (e.g., the communication module 190 in FIG. 1) positioned on the printed circuit board and configured to transmit or receive a wireless signal using the support member may be further included.

According to various embodiments of the disclosure, an electrical signal generated by the communication module may be transmitted to the second metal member by passing through at least one of the first metal member, the first solder, or the second solder.

According to various embodiments of the disclosure, the first protrusion may include a $(1\text{-}1)^{th}$ protrusion (e.g., the $(1\text{-}1)^{th}$ protrusion 311a in FIG. 6) and a $(1\text{-}2)^{th}$ protrusion (e.g., the $(1\text{-}2)^{th}$ protrusion 311b in FIG. 6) spaced apart from the $(1\text{-}1)^{th}$ protrusion, and the second through-hole may include a $(2\text{-}1)^{th}$ through-hole (e.g., the $(2\text{-}1)^{th}$ through-hole 323a in FIG. 7) accommodating the $(1\text{-}1)^{th}$ protrusion and a $(2\text{-}2)^{th}$ through-hole (e.g., the $(2\text{-}2)^{th}$ through-hole 323b in FIG. 7) accommodating the $(1\text{-}2)^{th}$ protrusion.

According to various embodiments of the disclosure, the second protrusion may include a $(2\text{-}1)^{th}$ protrusion (e.g., the $(2\text{-}1)^{th}$ protrusion 321a in FIG. 7) and a $(2\text{-}2)^{th}$ protrusion (e.g., the $(2\text{-}2)^{th}$ protrusion 321b in FIG. 7) spaced apart from the $(2\text{-}1)^{th}$ protrusion, and the first through-hole may include a $(1\text{-}1)^{th}$ through-hole (e.g., the $(1\text{-}1)^{th}$ through-hole 313a in FIG. 7) accommodating the $(2\text{-}1)^{th}$ protrusion and a $(1\text{-}2)^{th}$ through-hole (e.g., the $(1\text{-}2)^{th}$ through-hole 313b in FIG. 7) accommodating the $(2\text{-}2)^{th}$ protrusion.

According to various embodiments of the disclosure, the first metal member and the second metal member may include at least one of stainless steel or aluminum.

According to various embodiments of the disclosure, an electronic device (e.g., the electronic device 200 in FIG. 2) may include a display (e.g., the display 220 in FIG. 4), a support member (e.g., the support member 300 in FIG. 5), a printed circuit board (e.g., the printed circuit board 360 in FIG. 12) including at least one terminal (e.g., the first terminal 361a in FIG. 12), and a first metal sheet (e.g., the first metal sheet 351 in FIG. 11) disposed on the support member and electrically connected to the at least one terminal, wherein the support member may include a first metal member (e.g., the first metal member 310 in FIG. 6) including a first protrusion (e.g., the first protrusion 311 in FIG. 6) and a first through-hole (e.g., the first through-hole 313 in FIG. 6), a second metal member (e.g., the second metal member 320 in FIG. 7) surrounding at least a portion of the first metal member and including a second protrusion (e.g., the second protrusion 321 in FIG. 7) positioned in the first through-hole and a second through-hole (e.g., the second through-hole 323 in FIG. 7) accommodating the first protrusion, a first solder (e.g., the first solder 341 in FIG. 13) connected to the first protrusion and the second metal member, and a second solder (e.g., the second solder 343 in FIG. 13) connected to the second protrusion and the first metal member, and wherein the first solder may be positioned in a direction different from that of the second solder, based on the first metal sheet.

According to various embodiments of the disclosure, the support member (e.g., the support member 300 in FIG. 5) may include a first metal member (e.g., the first metal member 310 in FIG. 6) including a first protrusion (e.g., the first protrusion 311 in FIG. 6) and a first through-hole (e.g., the first through-hole 313 in FIG. 6), a second metal member (e.g., the second metal member 320 in FIG. 7) surrounding at least a portion of the first metal member and including a second protrusion (e.g., the second protrusion 321 in FIG. 7) positioned in the first through-hole and a second through-hole (e.g., the second through-hole 323 in FIG. 7) accommodating the first protrusion, a first solder (e.g., the first solder 341 in FIG. 13) connected to the first protrusion and the second metal member, and a second solder (e.g., the second solder 343 in FIG. 13) connected to the second protrusion and the first metal member, and at least a portion of the second solder may be disposed on the front surface (e.g., the $(1-1)^{th}$ support member surface 310a of the first metal member 310 in FIG. 6 and/or the $(2-2)^{th}$ metal member surface 320a of the second support member 320 in FIG. 7) of the support member, and at least a portion of the first solder may be disposed on the rear surface (e.g., the $(1-2)^{th}$ metal member surface 310b of the first metal member 310 in FIG. 6 and/or the $(2-3)^{th}$ metal member surface 320b of the second support member 320 in FIG. 7) of the support member.

According to various embodiments of the disclosure, the first metal member may include a $(1-1)^{th}$ metal member surface (e.g., the $(1-1)^{th}$ metal member surface 310a in FIG. 6) facing the display and a $(1-2)^{th}$ metal member surface (e.g., the $(1-2)^{th}$ metal member surface 310b in FIG. 6) opposite the $(1-1)^{th}$ metal member surface, and the first through-hole may be formed between the $(1-1)^{th}$ metal member surface and the $(1-2)^{th}$ metal member surface, and the first protrusion may protrude from the $(1-2)^{th}$ metal member surface.

According to various embodiments of the disclosure, the second metal member may include a $(2-1)^{th}$ metal member surface (e.g., the $(2-1)^{th}$ metal member surface 320d in FIG. 5) surrounding at least a portion of the first metal member, a $(2-2)^{th}$ metal member surface (e.g., the $(2-2)^{th}$ metal member surface 320a in FIG. 7) extending from the $(2-1)^{th}$ metal member surface and facing the $(1-2)^{th}$ metal member surface of the first metal member, and a $(2-3)^{th}$ metal member surface (e.g., the $(2-3)^{th}$ metal member surface 320b in FIG. 7) opposite the $(2-2)^{th}$ metal member surface, and the second through-hole may be formed between the $(2-2)^{th}$ metal member surface and the $(2-3)^{th}$ metal member surface, and the second protrusion may protrude from the $(2-2)^{th}$ metal member surface.

According to various embodiments of the disclosure, the support member may include a non-metal member (e.g., the non-metal member 330 in FIG. 5) having at least a portion thereof disposed between the first metal member and the second metal member.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   a support member; and
   a printed circuit board comprising at least one terminal electrically connected to a connection area of the support member,
   wherein the support member comprises:
   a first metal member comprising a first protrusion and a first through-hole,
   a second metal member surrounding at least a portion of the first metal member and comprising a second protrusion positioned in the first through-hole and a second through-hole accommodating the first protrusion,
   a first solder connected to the first protrusion and the second metal member, and
   a second solder connected to the second protrusion and the first metal member, and
   wherein the first solder is positioned in a direction different from a direction in which the second solder is located with respect to the connection area.

2. The electronic device of claim 1, further comprising:
   a first metal sheet disposed on the first metal member and the second metal member and electrically connected to the at least one terminal.

3. The electronic device of claim 1,
   wherein the first metal member comprises a $(1-1)^{th}$ metal member surface facing the display and a $(1-2)^{th}$ metal member surface opposite the $(1-1)^{th}$ metal member surface,
   wherein the first through-hole is formed from the $(1-1)^{th}$ metal member surface to the $(1-2)^{th}$ metal member surface, and
   wherein the first protrusion is configured to protrude from the $(1-2)^{th}$ metal member surface.

4. The electronic device of claim 3, wherein at least a portion of the second solder is disposed on the $(1-1)^{th}$ metal member surface.

5. The electronic device of claim 3,
   wherein the second metal member comprises a $(2-1)^{th}$ metal member surface surrounding at least a portion of the first metal member, a $(2-2)^{th}$ metal member surface extending from the $(2-1)^{th}$ metal member surface and facing the $(1-2)^{th}$ metal member surface of the first metal member, and a $(2-3)^{th}$ metal member surface opposite the $(2-2)^{th}$ metal member surface,
   wherein the second through-hole is formed from the $(2-2)^{th}$ metal member surface to the $(2-3)^{th}$ metal member surface, and
   wherein the second protrusion is configured to protrude from the $(2-2)^{th}$ metal member surface.

6. The electronic device of claim 5, wherein at least a portion of the first solder is disposed on the $(2-3)^{th}$ metal member surface.

7. The electronic device of claim 1, wherein the second metal member is configured to form at least a portion of a side face of the electronic device.

8. The electronic device of claim 1,
   wherein the first protrusion comprises a $(1-1)^{th}$ protrusion surface facing the second through-hole and a $(1-2)^{th}$ protrusion surface extending from the $(1\text{-}1)^{th}$ protrusion surface, at least a portion of the $(1\text{-}2)^{th}$ protrusion surface being exposed to an outside of the support member, and wherein the second protrusion comprises a $(2\text{-}1)^{th}$ protrusion surface facing the first through-hole and a $(2\text{-}2)^{th}$ protrusion surface extending from the $(2\text{-}1)^{th}$ protrusion surface, at least a portion of the $(2\text{-}2)^{th}$ protrusion surface being exposed to the outside of the support member.

9. The electronic device of claim 1, wherein the support member comprises a non-metal member, at least a portion the non-metal member being disposed between the first metal member and the second metal member.

10. The electronic device of claim 1, further comprising:
a second metal sheet disposed on the second metal member and connected to the at least one terminal of the printed circuit board.

11. The electronic device of claim 1, further comprising:
a communication module positioned on the printed circuit board and configured to communicate a wireless signal using the support member.

12. The electronic device of claim 11, wherein an electrical signal generated by the communication module is transmitted to the second metal member by passing through at least one of the first metal member, the first solder, or the second solder.

13. The electronic device of claim 1,
wherein the first protrusion comprises a $(1\text{-}1)^{th}$ protrusion and a $(1\text{-}2)^{th}$ protrusion spaced apart from the $(1\text{-}1)^{th}$ protrusion, and
wherein the second through-hole comprises a $(2\text{-}1)^{th}$ through-hole accommodating the $(1\text{-}1)^{th}$ protrusion and a $(2\text{-}2)^{th}$ through-hole accommodating the $(1\text{-}2)^{th}$ protrusion.

14. The electronic device of claim 1,
wherein the second protrusion comprises a $(2\text{-}1)^{th}$ protrusion and a $(2\text{-}2)^{th}$ protrusion formed substantially parallel to the $(2\text{-}1)^{th}$ protrusion, and
wherein the first through-hole comprises a $(1\text{-}1)^{th}$ through-hole accommodating the $(2\text{-}1)^{th}$ protrusion and a $(1\text{-}2)^{th}$ through-hole accommodating the $(2\text{-}2)^{th}$ protrusion.

15. The electronic device of claim 1, wherein the first metal member and the second metal member comprise at least one of stainless steel or aluminum.

16. The electronic device of claim 2, wherein the first solder is positioned in a direction different from that of the second solder, based on the first metal sheet.

* * * * *